April 9, 1968

L. G. DORSETT 3,376,657

AUDIO-VISUAL TEACHING MACHINE

Filed June 7, 1965

INVENTOR.
LOYD G. DORSETT

BY

*Dunlap & Laney*
ATTORNEYS

April 9, 1968 L. G. DORSETT 3,376,657
AUDIO-VISUAL TEACHING MACHINE
Filed June 7, 1965 6 Sheets-Sheet 2
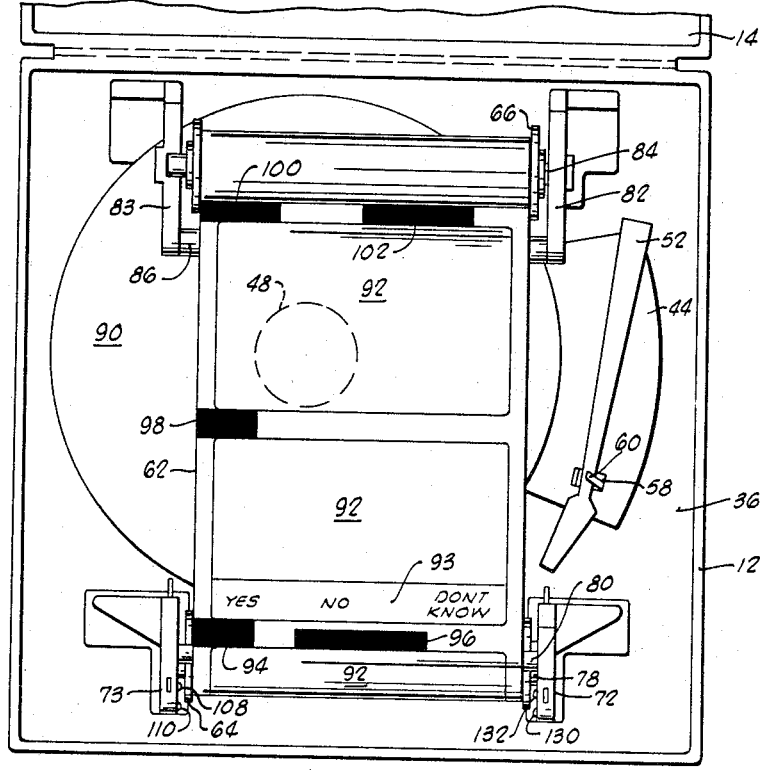
Fig. 3
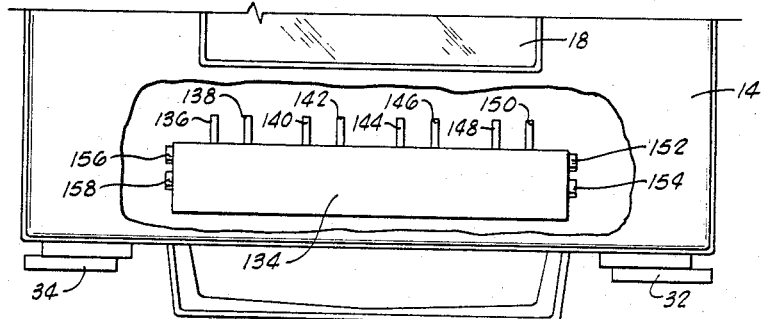
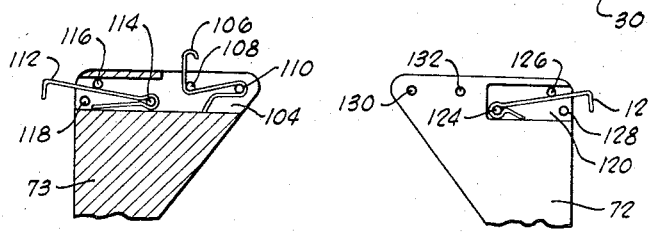
Fig. 4A Fig. 4B
Fig. 5
INVENTOR.
LOYD G. DORSETT
BY
ATTORNEYS April 9, 1968  L. G. DORSETT  3,376,657
AUDIO-VISUAL TEACHING MACHINE
Filed June 7, 1965  6 Sheets-Sheet 3
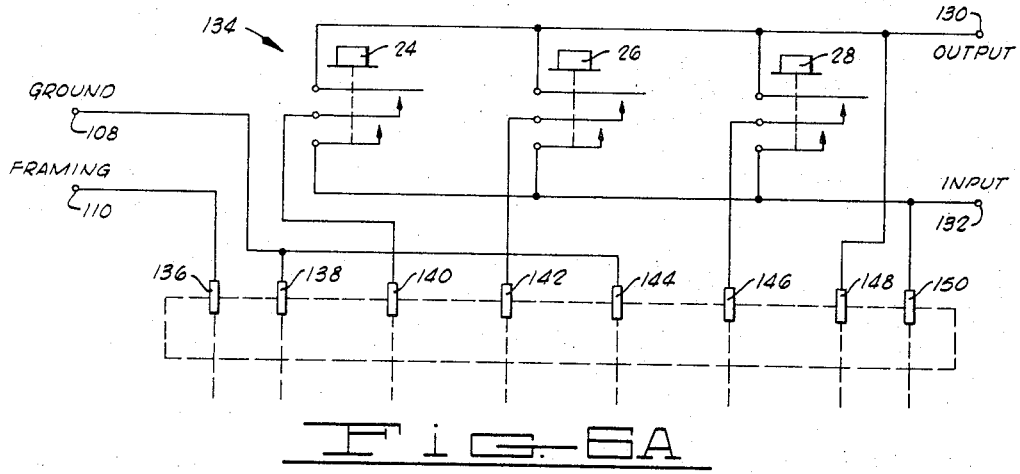
Fig. 6A
Fig. 6B
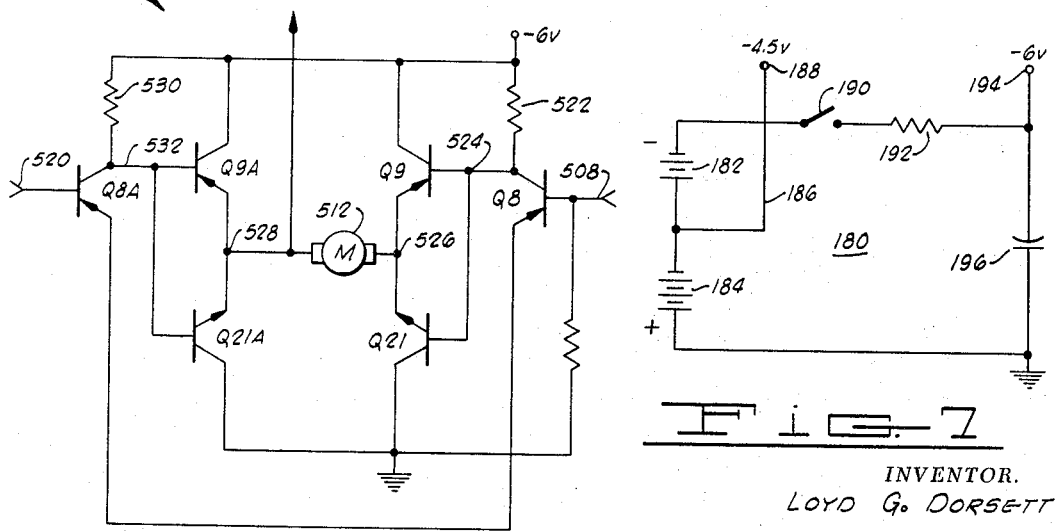
Fig. 10
Fig. 7
INVENTOR.
LOYD G. DORSETT
BY
Dunlap & Laney
ATTORNEYS

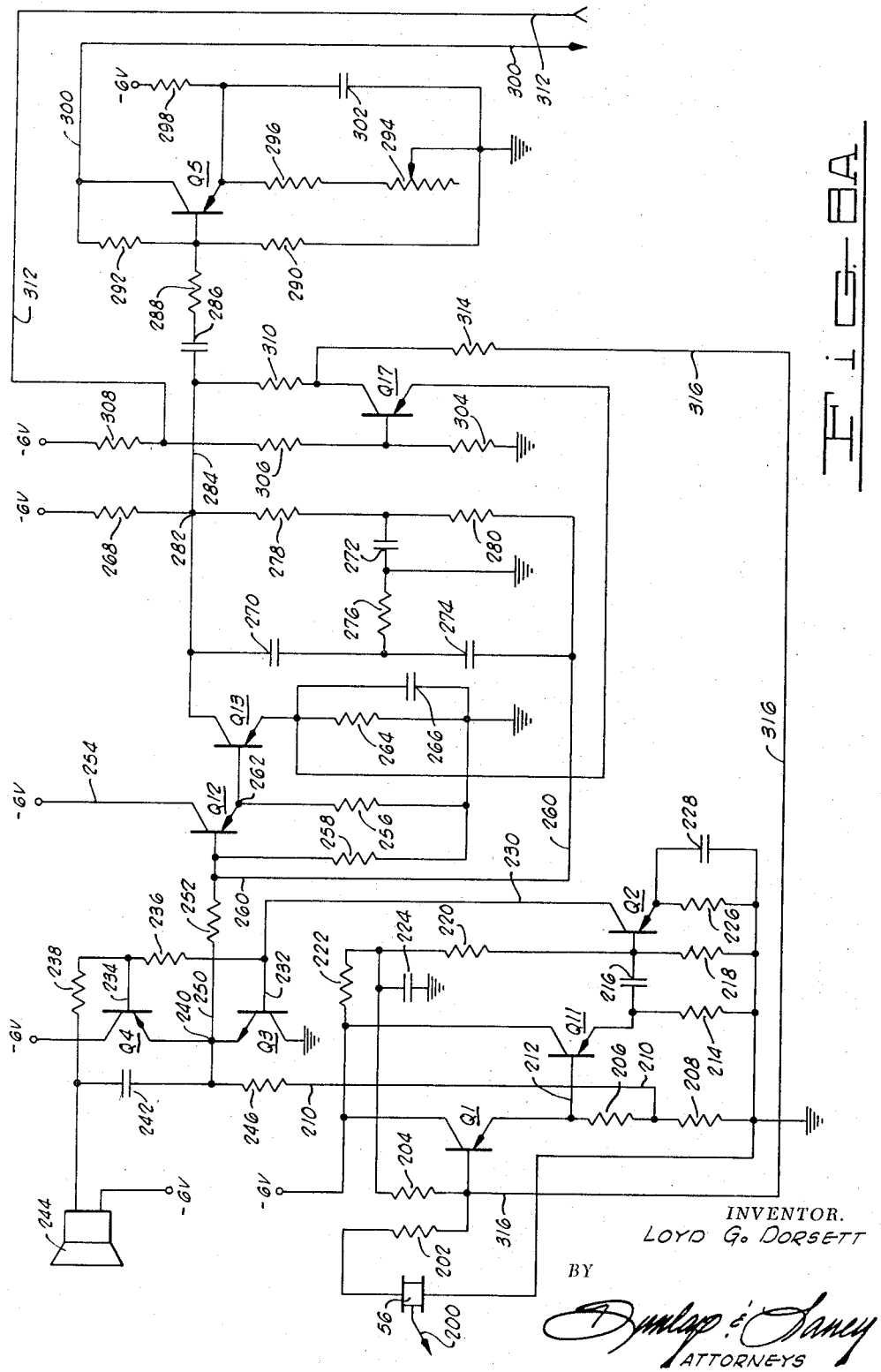

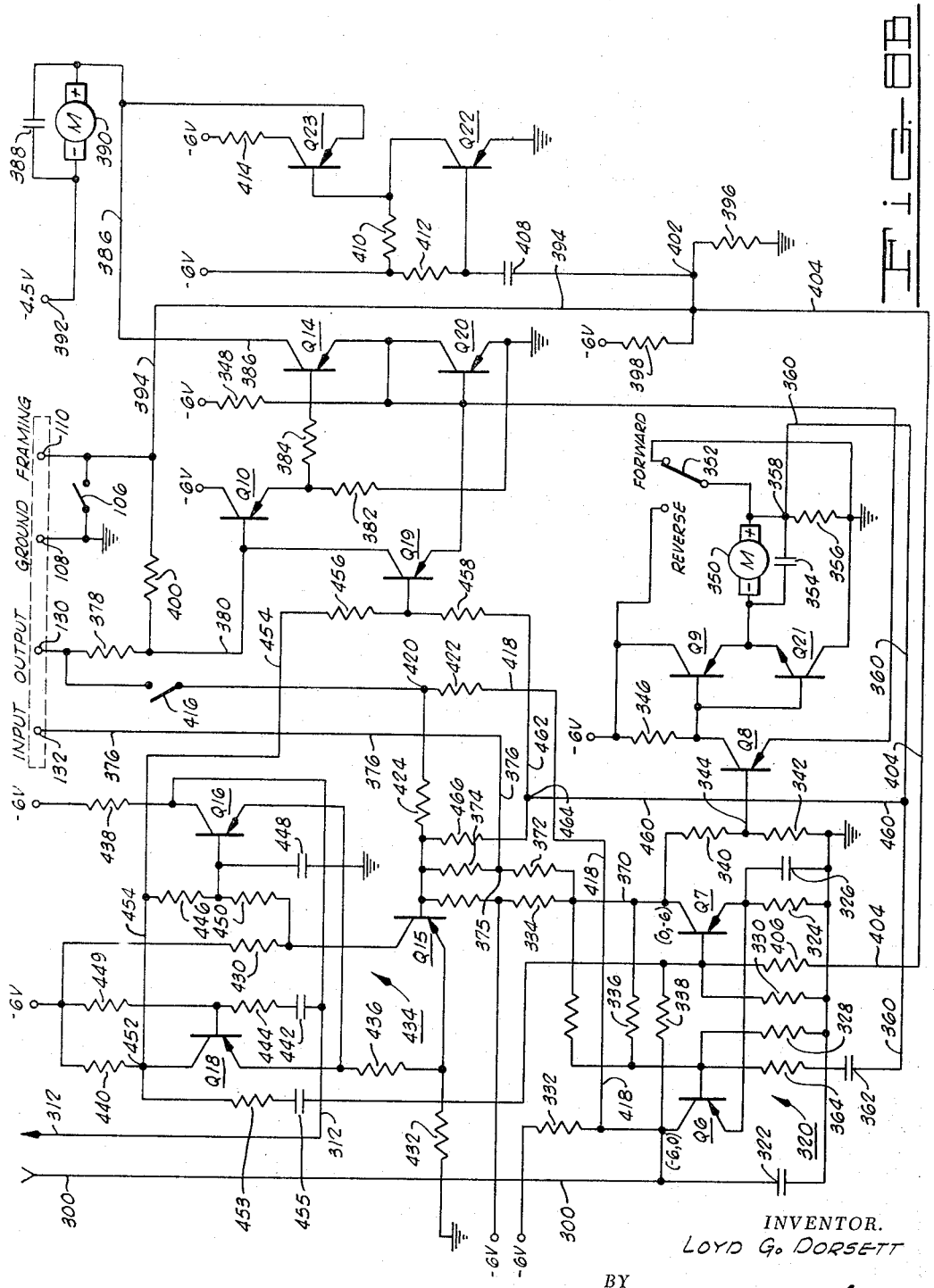

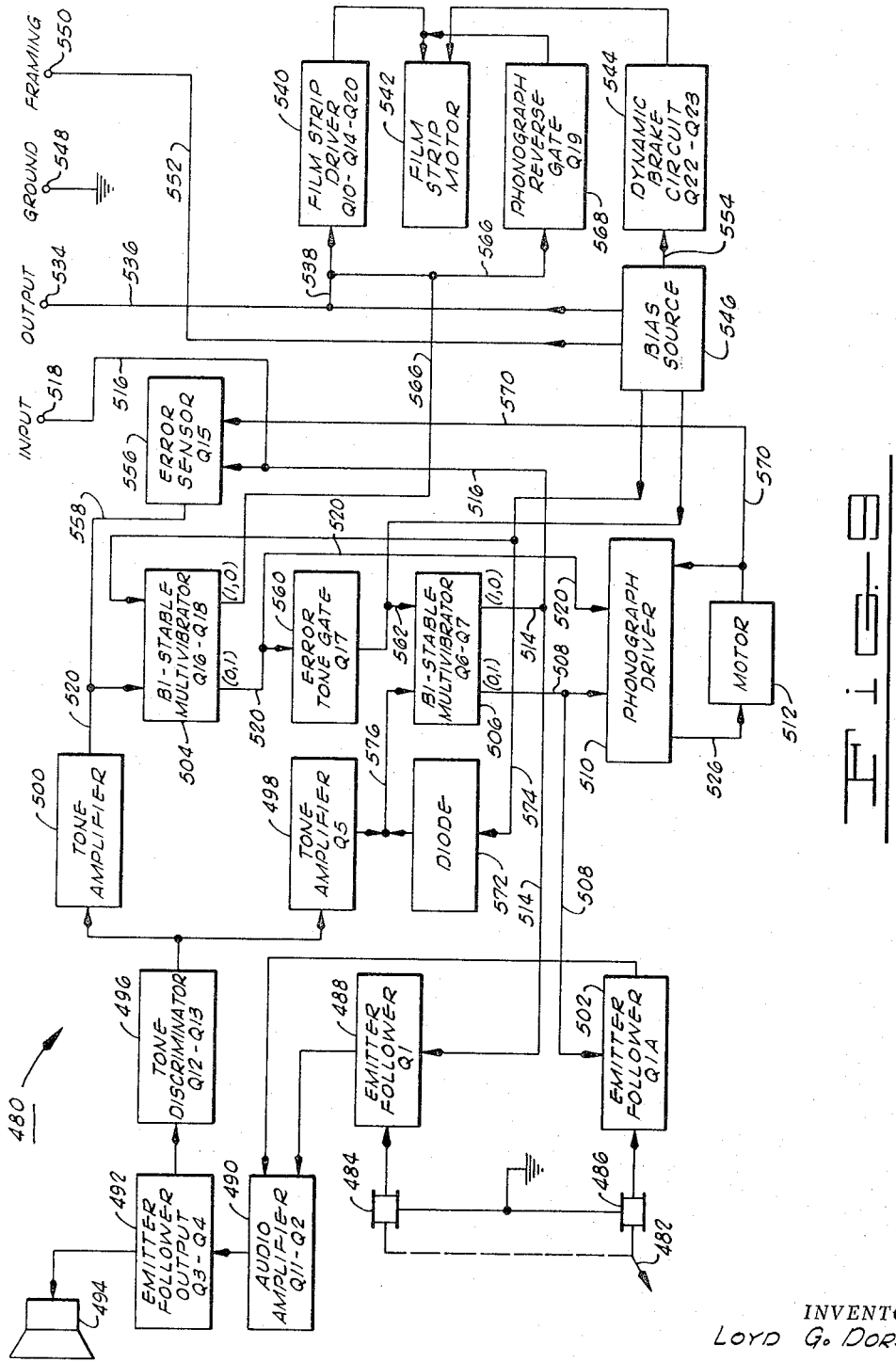

United States Patent Office 3,376,657
Patented Apr. 9, 1968

3,376,657
AUDIO-VISUAL TEACHING MACHINE
Loyd G. Dorsett, Purcell, Okla., assignor to Dorsett Industries, Inc., Norman, Okla., a corporation of Oklahoma
Filed June 7, 1965, Ser. No. 461,789
15 Claims. (Cl. 35—9)

ABSTRACT OF THE DISCLOSURE

Tutoring apparatus which utilizes a visual picture strip having certain answer code indications carried thereon, and an audio record bearing information as well as control tones. Logic circuitry controls audio playback in accordance with program data conveyed by the control tones, as further controlled by logic analysis of the answer code indications which are generated by a student response mechanism functioning with the picture strip.

---

Figure 1:
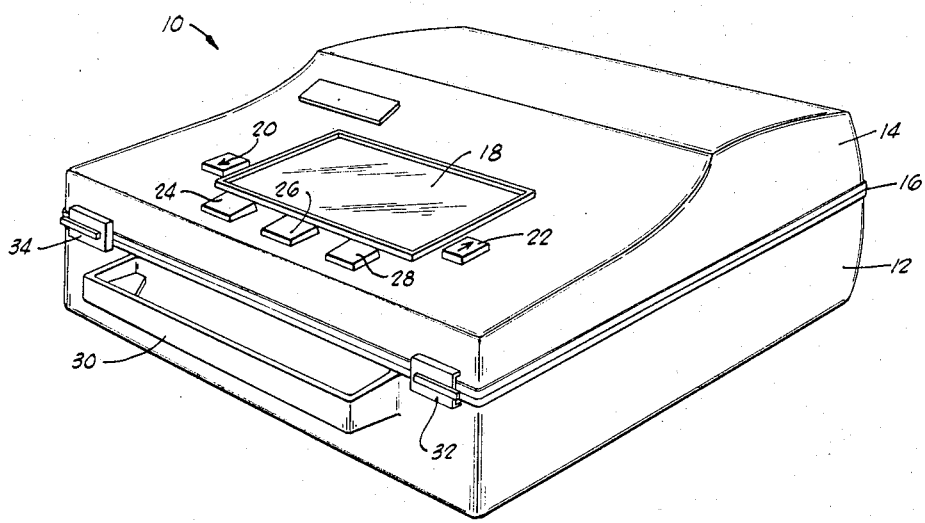

This invention relates generally, as indicated, to improvements in audio-visual teaching apparatus, and more particularly, but not by way of limitation, it relates to a compact teaching machine which enables active participation by the student and is subject to the student's control at all times.

There are various forms of audio-visual devices which are presently known and have found wide acceptance for use in teaching and training. Sound motion pictures, sound film-strips and, more recently, television have been utilized in many such systems, and specialized devices utilizing these media have been developed. These prior audio-visual devices have amply proven their value and many different forms are in wide use today. However, the devices employing these well-known media proved to be somewhat unsatisfactory for most teachers and students in the usual school and adult study situations. Some limiting factors are:

(a) The cost;
(b) The operating complexity of the projectors for associated electronic equipment;
(c) The cost of the information-containing media;
(d) The procurement and maintenance as to the information containing media; and
(e) The problem of the light conditions which must be maintained in the study room in order to allow viewing of the projected images.

The present invention is directed toward the provision of a portable, low-cost, audio-visual device which is usable in daylight with loudspeaker or earphones, and is extremely simple to operate. The apparatus aims to present a high quality visual and sound program for only a few cents per lesson-hour and, due to this low cost factor, it is then possible to supply the total teaching unit to each individual student of a group. Thus, with individual operation of the teaching machine, it is feasible to provide a logic system within the teaching unit which provides for student response in the form of multiple-choice push buttons, or even audible or written answers.

The present invention contemplates a teaching device which is unitary, compact, and light in weight which is capable of presenting coordinated audible and visual information to the participating student, and further, which is capable of interjecting the student's response into the proper operation and control of the device. In a more limited aspect, the present invention provides a device for reproducing recorded audible information and audio control tones which are employed to synchronize the separate movement of the visual information presentation and, also, to enable the logic circuitry to accept student responses. The invention further contemplates a novel alternative of the device wherein a bi-directional audio record is used with separate information to be reproduced for each direction, such that the student's active participation is enlarged still more and, not only are multiple choice selections enabled, but additional audible information can be disseminated on certain of the commands.

It is an object of the present invention to provide a compact, light-weight, comparatively low-cost teaching device which is suitable for individual student usage.

It is also an object of this invention to provide a teaching device that employs audio-visual media or format which can be made available at a much reduced cost and which is usable without the necessity for consideration of the ambient light or acoustical arrangements which may exist in the classroom, office, library or whatever.

It is further an object of the present invention to provide an audio-visual teaching device which incorporates in its operation active student participation in the form of multiple choice push buttons and further controls which may be energized in response to certain queries.

It is still another object of the present invention to provide a teaching device which is entirely operable on battery power and eliminates the need for power connections.

It is yet another object of this invention to provide a teaching machine which produces audio and visual information by means of a battery operated phonograph and a printed paper which is intermittently advanced in synchronization with the phonograph.

It is still further an object of the present invention to provide a teaching machine wherein the visual information is presented in synchronism and is coordinated with the audible information and, further, multiple push buttons are provided to allow the students active participation and wherein still further student control can be exercised to repeat audible information or to advance the visual information.

It is another object of the present invention to provide an audio-visual teaching machine wherein an incorrect answer response by the participating student will render an error indication and allow an additional answer choice.

It is also an object of this invention to provide a teaching device wherein a correct answer by a participating student will then enable the audio-visual device to proceed to the next segment of the lesson.

Finally, it is an object of the present invention to provide an audio-visual teaching device wherein a stereo audible record is employed and, under the participating student's control, can provide lesson information in one direction of playback and corrective or addendum information on the reversal of the direction of playback.

Other objects and advantages of the invention will be evident from the following detailed description when read in conjunction with the accompanying drawings which illustrate the invention.

Figure 2:
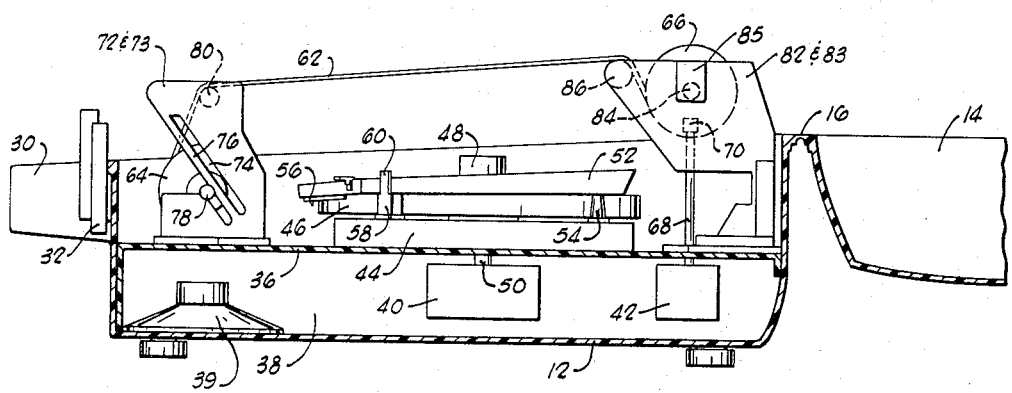

In the drawings:
FIG. 1 is an isometric view of the teaching machine;
FIG. 2 is a cutaway side-view of the teaching machine;
FIG. 3 is a top view of the teaching machine's inner workings;
FIGS. 4A and 4B depict close-up views of particular switch mechanisms employed in the teaching machine;
FIG. 5 is a cutaway, partial top-view of the teaching machine showing the mounting of a contact mechanism;
FIG. 6A shows a schematic diagram of the contact mechanism of FIG. 5;
FIG. 6B shows the conductive code arrangement on various visual strip conditions with energization alignment extended to the contact mechanism of FIG. 6A;
FIG. 7 is a schematic diagram of the power supply of the teaching machine;

FIGS. 8A and 8B constitute a schematic diagram of one embodiment of the machine;

FIG. 9 is a block diagram of an alternative embodiment of the teaching machine; and FIG. 10 is a schematic diagram of specific circuitry included in the block diagram of FIG. 9.

*Detailed description of one embodiment*

FIG. 1 shows the teaching machine 10 as it would appear when in use. The mechanism is contained by a suitable plastic case consisting of the bottom portion 12 and a top portion 14 which are connected along the rear edge by a hinge portion 16. The hinge portion 16 is merely a connecting beading which allows flexibility of the plastic material in opening and closing the lid portion 14. The lid portion 14 has a rectangular viewing opening 18 which is preferably framed over with a glass facing.

A push button 20 is provided for phonograph reversing actuation and a push button 22 can be actuated to energize the visual strip mover as will be described. Push buttons 24, 26 and 28 provide multiple choice selection to enable answer response by the participating student and this too will be further described. The lower casing portion 12 is formed to have a handle 30 and suitable lid closure and locking fixtures 32 and 34. The handle 30 is molded as an integral part of the plastic casing member 12 and the locking fixtures 32 and 34 are also fabricated from plastic to form rotatable locking fasteners.

FIG. 2, the side view of the teaching machine, shows the manner in which a chassis 36 fits within the lower portion 12 of the case 10. The chassis 36 defines a space 38 wherein the electronic circuitry (not shown) and speaker 39 are mounted. A phonograph drive motor assembly 40 and a visual strip drive motor assembly 42 are also suitably mounted on the underside of the chassis 36. A turntable base 44 is mounted on the top of chassis 36 and this member carries a turntable 46 and center spindle 48 which are drivingly connected through a shaft 50 and a suitable gearing means to be driven by the phonograph drive motor assembly 40. The turntable base 44 also carries a tone arm 52 as supported on the post 54 to position the playback cartridge 56. A tone arm support holder 58 is also carried on the turntable base 44, and this support 58 includes a plastic extension 60 which serves as a locking member to hold the tone arm firmly during transport of the teaching machine 10.

The visual strip material 62, which is in most applications to be the printed paper type, is supplied from an unwind reel or spool 64 to a winding spool 66. The winding power is supplied from the visual strip drive motor assembly 42 which is mounted on the underside of chassis 36, via the shaft 68 which is capped with a rubber snubber 70 in driving contact with the edge of winding spool 66. A plastic drive gear and toothed spool rim may also be used.

The supply spool 64 of visual strip material is rotatably held between a pair of members 72 and 73 (see FIG. 3). Each of the members 72 and 73 has a cut out portion 74 which allows a spring effect in the portion 76 to allow a holding tension against the spindle 78 of spool 64. A suitable holding groove or other molded configuration can be incorporated in the lower portion of upright support members 72 and 73 in order to position and maintain the spindle 78. The unwound strip material 62 is then lead up and over a lucite or other suitable plastic roller member 80, whereupon it proceeds past the window opening 18 (see FIG. 1) and on back to the take-up reel or spool 66. Another pair of plastic upright supports 82 and 83 are positioned at the rear of the chassis 36 to hold the take-up reel 66. Each of the upright supports 82 and 83 are molded to have a vertical slot portion 85 on its interior side such that the spindle 84 of the winding reel 66 can rest movably therein. A further lucite or other plastic roller rod 86 is positioned between the members 82 and 83 in order to direct and properly tension the visual strip 62 in its travel toward wind-up.

Proceeding now to FIG. 3, there is shown the teaching machine 10 in its opened position, that is, with lid 14 completely opened up. FIG. 3 shows essentially the same structure as was enumerated in connection with FIG. 2. A phonograph record 90 is shown in position on the turntable 46 as aligned with the spindle center piece 48. This record is preferably a 16 r.p.m., seven-inch record with audible information and periodic control tones recorded thereon, however, it should be understood that other speeds and/or sizes may be desirable in particular applications. The tone arm 52 can then be rotated inwardly to the proper position on the rim of record 90 to begin the machine operation. The visual strip material 62 is shown in greater detail as including a series of frame portions 92 wherein the pictorial or visual lesson material would be printed or otherwise placed in whatever the desirable form. In certain cases it will be advantageous to include subscript material as to answer choices and this can be written as shown in a portion 93 of the information frames 92. As shown in the example at 93 the student would have three choices which would line up with the push buttons 24, 26 and 28 (see FIG. 1) and the choice would be made by depression of the particular push button.

Integral with the push button or answer selection mode of operation are conductive bars such as 94 and 96 which would appear between the frames. These conductive bar portions are laid on the visual strip 62 in the form of conductive ink and provide a coded contact surface for interaction with the push button answer selectors. A multiple of various code or conductive configurations are employed so that all desired answers or conditions of operation can be met. Further conductive ink portions 98, 100 and 102 are shown on the visual strip 62, that is, those frames which are in view, and it should be understood that various coding configurations may be employed in order to properly contact the push button switching mechanism as will be described below.

FIG. 4A shows an enlarged view of the left upright supply spool support member 73. The member 73 is provided with a recessed portion 104 wherein a pair of spring switches are located. A first spring switch member 106 is biased to be in contact with the contact pin 108 as it is connected around the contacting pin 110. This is a lid interlock switch and is opened upon closing of the case lid 14 to depress the member 106 thus enabling machine operation. A second spring switch member 112 is connected around contacting pin 114 and biased to maintain contact with a contact pin 116 during normal operation. A contact pin 118 is situated to be connected through spring member 112 to contact pin 114 when the phonograph reverse push-button 20 (see FIG. 1) is depressed. The movable end of spring member 112 is situated to be directly beneath the push-button 20 when the case lid 14 is fastened shut.

FIG. 4B shows the opposite or right-hand unwinding support member 72 having a recessed portion 120 wherein a spring member 122 is fastened at contact pin 124 and biased upwardly against contact pin 126. The spring contact member 122 can be depressed to contact the contact pin 128. This depression is done by means of the push-button 22 (see FIG. 1) which, upon actuation, serves to advance the visual drive mechanism to the next frame. The electrical connections of the various contact pins are then led down to the electronic circuitry beneath the chassis 36 and this will be further described in connection with the electronics and control of the system.

FIG. 5 shows a top-view of the closed teaching machine case with a cut-away portion to show a contact mechanism 134. The contact mechanism 134 is fastened beneath the underside of the case lid member 14 and in such a position that a series of pairs of spring metal contacts 136 and 138, 140 and 142, 144 and 146, and 148 and 150 will come into contact with the visual strip 62. That is, when the lid 14 is closed and locked, the spring fingers 136 through 150 will all depress against the visual strip 62 at the roller bar 80 (also see FIG. 3) so that firm contact will be made with any conductive ink portions (such as 94 or 96) which may be present across the particular conductive code configuration.

The contacts 136 and 138 are framing contacts and the conductive portions relating to these framing contacts, such as 94, 98 and 100 of FIG. 3, are present in each code configuration. When visual strip 62 is properly framed, the contacts 136 and 138 will provide a short circuit which is conducted through the contacts 156 and 158 to respective contacts 108 and 110 (upon lid 14 closure) to the electronic circuitry below which is to be further described. The remainder of the contacts 140 to 150 provide switch closures, depending on the code configuration, to contacts 152 and 154 which conduct through the output contact 130 and input contact 132 to the electronic circuitry. These switch closure indications are only conducted when the lid is closed to thereby apply the logic switching information to the electronic circuitry. Thus, with the lid 14 closed the contacts 108 and 110 of FIG. 3 would connect with contacts 156 and 158 of FIG. 5 and, in the same manner, contacts 130 and 132 of FIG. 3 would be brought into engagement with spring contacts 152 and 154 of FIG. 5.

FIG. 6A shows the switch mechanism 134 in schematic form and it also shows the alignment of contact members 136 to 150 with the various configurations of conducting ink (FIG. 6B). Thus, it can be seen that depression of the push buttons 24, 26 and 28 (FIG. 1) will short the input 132 to the output 130, presenting a control indication to the electronic circuitry, and also this electrical indication will be present on the respective contacting fingers 140, 142 and 146. FIG. 6B shows the various conductive coating configurations for the correct answers as may be indicated by depression of the correct one of push buttons 24, 26 or 28. In the case where push button 24 is the correct answer, it can be seen that depression of push button 24 in FIG. 6A will short the input 132 to the output 130, however, the spring contact 140 will not find a ground along the coded conductive strip 160. This enables proper operation of the teaching machine. Depression of wrong push buttons 26 or 28 will not only short the input 132 to the output 130 but they will also find ground contacts through their respective spring contact fingers 142 and 146 to contact 144 and the ground terminal 108. In the same manner, a correct answer for push button 26 will not allow the spring contact 142 to find a ground on the conductive strip 162 and, similarly, a correct answer as would be required with push button 28 would not find ground for the spring finger 146 on the conductive portion 164.

The conductive strip 166 indicates a further conductive ink contact mark which may be used where an "entertainment" or automatic advance procedure is to be instituted and no student response is required. This mode merely requires a conductive ink portion 168 which shorts the contact spring fingers 148 and 150 to connect the input 132 to the output 130 at each framing interval. The ground contact 108 and framing contacts 110 are always maintained shorted when visual strip 62 (FIG. 3) is stopped so that after the initial moving of the strip and breaking of the short circuit it will come to its proper stopping place after movement of one frame. The actual operation and the effects of the various contacts for signal switch closures will be more fully described below in connection with the electronic logic circuitry.

FIG. 7 shows the power supply 180 which is used in the teaching machine 10. Power supply 180 employs series connected dry cells 182 and 184 which supply, for example, a total voltage of 6 volts. A center tapped output on lead 186 is connected to an output terminal 188 to provide minus 4.5 volts DC. A second output through a switch 190, a switch which is actuated by positioning of the tone arm 52 (see FIG. 3), and through a limiting resistor 192 to an output terminal 194, supplies minus 6 volts DC. A filter capacitor 196 is connected across the total voltage supply to ground. The teaching machine performs very well with the use of four, ordinary type-D flashlight cells, however, the alkaline, mercury and nickel-cadmium cells are rated for several times more energy and can be procured in the same physical size. Use of these would be desirable from the standpoint that the machine life can be materially increased without the danger of loss of power.

FIG. 8A shows a first part of the electronic control and logic circuitry which is utilized in the teaching machine 10. The phonograph cartridge 56, energized by the recording needle 200, supplies an input signal through an impedance matching resistor 202 to the base of Q1, a type PNP transistor. The recorded information on record 90 (FIG. 3) consists of the audio message or lesson information which is intersticed at selected intervals with a 250 cycle control tone. With appropriate circuit changes, other control tone frequencies may be used. Transistor Q1 is operated as an emitter follower with the base biased through resistance 204, and the collector connected directly to the minus 6 volt supply so that the emitter output is taken across the resistors 206 and 208. Negative feed back is applied on lead 210 to the emitter circuit of transistor Q1, the source of which will be later described. The transistor Q1 emitter output on lead 212 is then applied to the base of a transistor Q11, another type PNP transistor which is operated as an emitter follower.

The transistor Q11 also has the collector connected directly to the minus 6 volt supply and the emitter is connected to ground through the load resistor 214, such that the low impedance output from the emitter of transistor Q11 is coupled through a capacitor 216 to the base of a transistor Q2, a PNP common emitter amplifier. The transistors Q1 and Q11 are operated as emitter followers to match the high impedance of the phonograph cartridge 56 with the low impedance input to the transistor Q2, a voltage amplifier.

The base of transistor Q2 is biased from a voltage divider network consisting of a resistor 218 connected to ground and series resistors 220 and 222 connected to the minus 6 volt supply. A filter capacitor 224 is connected to the voltage divider network to remove regenerative voltage. The emitter of transistor Q2 is biased by a resistor 226 and a by-pass capacitor 228 connected to ground, and the collector is connected on a lead 230 to the inputs of an audio amplifier consisting of the complementarily connected transistors Q3 and Q4.

The transistor Q3, a type NPN, and the transistor Q4, a type PNP, are connected in complementary emitter follower relationship and the common input on lead 230 is applied on the base leads 232 and 234 to the respective transistors Q3 and Q4. A low value of resistance 236 is interposed between the base leads 232 and 234, and a resistance 238 serves to bias the respective bases from the negative voltage supply. The collector of Q3 (N material) is grounded while its emitter is connected to the opposite type of the emitter of transistor Q4, and the Q4 collector is connected to the minus 6 volt supply. The emitter follower output is taken at the junction 240, whereupon it is applied through a coupling condenser 242 to the speaker 244 which is also returned to the minus 6 volt supply. Also from the junction 240, a negative feed back voltage is coupled through a resistance 246 on lead 210 to the emitter circuit of the transistor Q1, as was referred to previously. The complementary output stages consisting of transistors Q3 and Q4 serve to match the large decrease in impedance between the amplifier transistor Q2 and the speaker 244. It should be understood, however, that not only a speaker 244 but also an earphone connection or both may be employed in the conventional manner for audible lesson reproduction.

From the amplified output at junction 240 it is also desirable to tap off and employ any control tones which may be present; hence, the signal is conducted on a lead 250 through a resistance 252 to the base of transistor Q12. The transistor Q12 and transistor Q13 circuitry makes up a sharply tuned, Twin Tee active filter. The collector of transistors Q12, a type PNP transistor, is connected directly to the minus 6 volt supply and the emitter is biased through a resistor 256 to ground. The base of transistor Q12 is biased from ground through a resistor 258, and a degenerative feedback input is provided on lead 260 from the Twin Tee filter output. Transistor Q12 operates essentially as an emitter follower and the output at junction 262 is applied to the base of the transistor Q13, another type PNP transistor. The emitter of transistor Q13 is connected through a bias resistor 264 and by-pass condenser 266 to ground, and the collecter is connected through a resistance 268 to the minus 6 volt supply. The Twin Tee filter network, consisting of the capacitors 270, 272 and 274 and the resistors 276, 278 and 280 is connected between the collector or output junction 282 of the transistor Q13 amplifier and back to the base or input of the transistor Q12 emitter follower. Thus, the signal output of the transistor Q13 as taken at junction 282 is primarily a 250 cycle per second control tone when any output is present.

Any 250 c.p.s. control signal which is present at junction 282 is then conducted on lead 284 through a coupling capacitor 286 and limiting resistor 288 to the base of a transistor Q5, a type PNP transistor which functions as a limited amplifier. The base or input of transistor Q5 is connected through a resistance 290 to ground and through a stabilizing resistor 292 to the collector. The emitter is biased from a voltage divider consisting of a rheostat 294, resistor 296 and resistor 298 connected between ground and the minus 6 volt supply. The transistor Q5 is normally cut off as per the bias on its emitter, and the rheostat connected, variable-resistance 294 functions as a sensitivity control to adjust the cut-off level. The collector of transistor Q5 is connected via a lead 300 from which it receives the collector voltage and by which the collector current is employed to actuate subsequent logic circuitry as will be explained. A capacitor 302 is connected between the emitter of transistor Q5 and ground to insure a sufficient length of hold-off time whenever transistor Q5 is in its non-conducting state.

A transistor Q17 can be enabled to cause the generation of an error tone in the audio and speaker components of the unit. The transistor Q17 is connected so that it is normally conducting. Transistor Q17 is a PNP type and the emitter is connected back to the emitter resistance 264 of the transistor Q13 stage. The base is biased by a voltage divider consisting of resistors 304, 306 and 308 to minus 6 volts and the collector is connected through a resistance 310 to the junction 282 and finally through a load resistor 268 to the minus 6 volt supply. When an error choice is made by a participating student, a more positive voltage will appear on a lead 312 (as will be described) which drives the base of transistor Q17 positive by an amount sufficient to cut-off conduction therethrough. When transistor Q17 ceases its conduction, it enables an audio, regenerative feedback path consisting of resistors 310 and 314 and lead 316 which couple sufficient audio from the junction point 282 back to the audio amplifier input at the base of transistor Q1 such that oscillation at the tuned filter frequency will occur. This oscillation frequency is then amplified through the amplifier stages consisting of transistors Q1, Q11, Q2 and the emitter follower output stages Q3 and Q4, whereupon the tone is reproduced in the speaker 244 or earphones. The positive going error tone enabling signal on lead 312 originates from logic circuitry (to be described) and it causes an error tone to be reproduced by the speaker 244 of about two seconds duration.

FIG. 8B illustrates further control and logic circuitry in schematic form. A control tone indication on lead 300 of FIG. 8A (that is, when transistor Q5 is conducting in response to a 250 cycle tone burst), is supplied to the collector of a transistor Q6 in FIG. 8B. The transistors Q6 and Q7 comprise a bi-stable multivibrator 320 which is the central control element in the logic circuitry. An integrating capacitor 322 is connected between lead 300 and ground for the purpose of integrating the tone signal over a fraction of a second to further distinguish valid control tone signals from pops, scratches or peak voice impulses.

The bi-stable multivibrator 320 is a conventional type. The transistors Q6 and Q7 are connected in common emitter configuration through a resistor 324 and by-pass capacitor 326 to ground. The base of transistor Q6 is connected through a resistance 328 to ground, and the base of transistor Q7 is biased by connection through a resistor 330 to ground. The collectors of transistors Q6 and Q7 are connected through respective resistors 332 and 334 to the minus 6 volt supply. Cross-coupling is supplied by a resistance 336 from the collector of transistor Q7 to the base of transistor Q6 and by a resistance 338 from the collector of transistor Q6 to the base of transistor Q7. This then, as so far described, is the bi-stable multivibrator 320 inclusive of its active elements. Numerous input and output leads, for various control functions, are present on the collector and base points and these several leads will be described below in the same order as the respective circuit portions.

The state of the bi-stable multivibrator 320 determines whether the phonograph is running or stopped. With no signal input or a more negative voltage on lead 300, whereby Q6 is cut-off and Q7 is conducting, a more positive voltage on the collector of transistor Q7 is present across the voltage divider consisting of resistors 340 and 342 to ground. A center-tapped voltage on lead 344 is then present to cut-off conduction of the transistor Q8. Transistor Q8 has the collector connected through a resistor 346 to the minus 6 volt supply and the emitter is connected through a diode connected transistor Q20 to ground. The base-collector electrodes of transistor Q20 are biased through a resistance 348 to maintain them at a slightly negative voltage, thus placing a substantially regulated emitter bias on the transistor Q8.

Thus, when transistor Q8 is cut off, an increased negative voltage is applied at the base of transistor Q9, a PNP type transistor, and the transistor Q9 is caused to conduct through a phonograph motor 350 (a part of the assembly 40 shown in FIG. 2) to ground causing the motor to run in the forward direction. The phonograph motor 350 is one of the commercially available types of small, D-C motors. The transistor Q9 has its collector connected directly to the minus 6 volt supply such that the more negative voltage of its base will cause heavy conduction from ground through the forward position of switch 352, through the phonograph motor 350, and the transistor Q9 circuit. The motor 350 includes a noise reducing capacitor 354 and a low value of resistance 356 is provided as a transient voltage suppressor for use in reverse operation of the motor 350 as controlled by means of the forward-reverse switch 352.

In the reverse operation, the reverse position of switch 352 couples the minus 6 volt supply to the opposite end of motor 350 and at the same time a reverse control voltage is developed at the junction 358 for conduction on the reversing lead 360. This is a negative going voltage on lead 360 and it is coupled through a capacitor 362 and resistor 364 to the base of transistor Q6, part of the bi-stable multivibrator 320. This negative voltage on the base of transistor Q6 will then reverse the state of multivibrator 320, causing transistor Q6 to conduct and transistor Q7 to cut-off with the result that a more negative voltage is present on the collector of transistor Q7 and this voltage is apparent across resistor 340 and upon the base of transistor Q8 to cause it to go into conduction. When transistor Q8 conducts, its collector voltage approaches ground potential which is then tied over to the bases of PNP transistor Q9 and the NPN transistor Q21 to conduct. Hence, transistor Q21 conducts current through the motor 350 in the opposite direction causing reverse phonograph operation.

When the phonograph is running in its normal position, that is, in the forward direction, the bi-stable multivibrator 320 is in its state one conduction with transistor Q6 cut-off and transistor Q7 conducting, as has been described previously. When a control tone (250 c.p.s.) has been detected by the reproducing element 56 (FIG. 8A) and the control tone has caused increased conduction of transistor Q5 with the resulting positive going output on lead 300 to the transistor Q6, the bi-stable multivibrator 320 reverses to its opposite stable state or state two conduction. Thus, when the collector of transistor Q6 is made more positive, conduction is begun and, with the conventional multivibrator cross coupling by means of resistors 336 and 338, the opposite conduction or state two is rapidly achieved.

Since transistor Q7 is then in its cut-off state, a more negative voltage is apparent from the collector of transistor Q7 and across the resistor 340 to the base of transistor Q8, thereby causing transistor Q8 to conduct. This conduction through transistor Q8 develops greater voltage in the load-resistance 346, thereby placing a more positive bias on the bases of transistors Q9 and Q21 and hence on their common emitters, such that there is no conduction through the phonograph motor 350 and the phonograph is stopped. This condition exists since the forward-reverse switch 352 is in its normal or "forward" position and the collector of NPN transistor Q21 is open.

In this condition the machine is waiting for an answer as would be supplied by the participating student through control of the push button switches 24, 26 and 28 as shown in FIG. 1. The push button answer switch and the particular arrangement of coded conductive ink as described in connection with FIGS. 6A and 6B would be employed for answer control. Shorting of input 132 to output 130 would designate a correct answer and the shorting of input 132 and output 130 to ground would designate an incorrect answer. Thus, with the bi-stable multivibrator 320 in its stable state two, and with the phonograph motor 350 stopped (as when transistor Q7 is non-conducting), an increased negative voltage is apparent on Q7 collector lead 370 and through the voltage divider consisting of resistors 372 and 374 to the base of a transistor Q15, such that a voltage of about minus 2.4 volts is present from junction 375 on lead 376 to the input 132.

When input 132 is shorted to output 130, upon actuation of a correct answer button (24, 26 or 28 of FIG. 1), the control voltage is impressed through a resistance 378 and via lead 380 to the base of a transistor Q10. This will cause the emitter of transistor Q10, which is grounded by means of a resistor 382, to go negative by a sufficient amount such that a transistor Q14 having its base connected to the emitter of transistor Q10 will conduct heavily. In this respect, the collector of transistor Q10 is connected directly to the minus 6 volt supply and the negative going control voltage input on lead 380 will cause heavy conduction from ground to the minus 6 volt supply through the transistor Q10. This in turn develops a more negative voltage through resistance 384 to the base of transistor Q14, thereby causing heavy conduction through the collector of transistor Q14 on lead 386 through the noise suppressor capacitor 388 and a visual strip drive motor 390 (a part of the assembly 42 shown in FIG. 2) to the minus 4.5 voltage supply at terminal 392. The strip drive motor 390 is another of the well-known miniature D-C motors. The transistor Q20, in the emitter circuit of transistor Q14, is diode connected, having its base and collector tied together, and biased through a resistance 348 to the minus 6 volt supply, such that it permits the transistor Q14 to be cut off completely when transistor Q10 is not conducting.

The ground contact 108 and framing contact 110 also serve to aid in the control of the visual strip drive motor 390. As it was noted in the FIG. 6A and 6B illustration, when a lesson block is properly framed and the strip drive motor 390 is not operative, a conductive ink shorting segment maintains the framing contact 110 grounded. The framing contact 110 is connected to a lead 394 which receives a negative bias voltage from a junction 402 of the voltage divider consisting of resistors 396 and 398 connected between ground and the minus 6 volt supply. This negative bias voltage is also applied through a resistor 400 to the lead 380 attached to the base of transistor Q10. The lid switch 106 is connected between ground contact 108 and framing contact 110, so that the framing is shorted to ground whenever the lid is open to prevent advance of the visual strip drive motor 390. Thus, whenever the framing-ground contact is broken, sufficient voltage is present on lead 394 through resistor 400 to the base of transistor Q10 to cause it to conduct. Therefore, any time the framing contacts are broken, the visual strip will advance to the next frame. In this manner, by shorting the input 132 to the output 130 as on correct answer, the visual strip will be advanced by motor 390 due to the conduction of transistor Q10 to break the framing-to-ground contact and thereafter the strip will continue to the next frame at which time a coded ink portion will again ground the framing contact 110 to the ground contact 108. This insures that the strip will continue to the next frame even though the correct answer button is released by the participating student before arrival of the strip 62 at its proper framing position.

As the visual strip is being advanced, and the framing contact 110 is not grounded to thereby ground the voltage at junction 402 of voltage divider resistors 396 and 398, a more negative control voltage will be present on lead 404 through a limiting resistor 406 to the base of transistor Q7. This control voltage on lead 404 causes transistor Q7 to conduct heavily, thereby cutting off transistor Q6, with the result that the bistable multivibrator 320 is again in its stable state one, which causes the phonograph motor 350 to run in its forward direction. When the multivibrator 320 is in state one, the collector voltage of transistor Q7, as tapped off from voltage divider resistors 372 and 374 on lead 376, will have dropped to approximately ground potential and therefore the answer buttons will have no effect during the audio presentation.

Returning again to that condition where the ground-framing contact was broken by movement of the visual strip, thus removing the conductive ink portion from its connecting contact, the voltage present at junction 402 of the voltage divider (consisting of resistors 396 and 398) causes a capacitor 408 to charge up to approximately minus 2 volts, that voltage present at junction 402. A transistor Q22, having the emitter grounded and the collector connected through a resistor 410 to the minus 6 volt supply, and with base bias provided from the minus 6 volt supply through a resistance 412, is maintained conducting whenever the framing contacts are broken and the voltage at the junction 402 is not grounded. This conduction of transistor Q22 maintains a more positive base voltage on transistor Q23, prohibiting current flow therethrough. The emitter of transistor Q23 is connected through the lead 386 to visual strip drive motor 390, and the collector is connected through a resistance 414 to the minus 6 volt supply.

When the visual strip has run its framing course, that is a new frame is in alignment with the viewing area 18 (FIG. 1) and a conductive ink portion is again shorting the ground contact 108 and framing contact 110, a discharge of capacitor 408 cuts off the transistor Q22 which, in turn, causes transistor Q23 to conduct heavily. Since the collector of transistor Q23 is connected to the minus 6 volt supply which is more negative than the strip motor voltage at terminal 392, a reverse current will flow through the strip motor 390 acting as a dynamic brake which causes the visual strip 62 (FIG. 3) to stop with minimum over-travel.

A visual strip advance switch 416 (shown adjacent to output terminal 130) is provided which will allow the visual strip to be advanced when the phonograph is running forward. The switch 416 would be actuated by the push button 22 in FIG. 1 and this function is enabled only when the phonograph runs in the forward direction. This is the condition when bi-stable multivibrator 320 will be in state one conduction with the collector of transistor Q6 at a more negative voltage, such that lead 418 provides energization to a voltage divider junction 420 between divider resistor 422 and 424. This voltage at junction 420, when connected through the visual strip drive switch 416 and resistor 378 to the lead 380, will provide sufficient bias on the base of transistor Q10 to cause it to conduct such that Q14 is made to conduct through the visual strip drive motor 390. The strip advance cannot be actuated with the phonograph stopped since multivibrator 320 would be in state two conduction and the voltage on the collector of transistor Q6 is dropped to near its ground potential such that it is no longer sufficient to drive Q10 into conduction.

In the event that an incorrect answer button is pushed by the participating student, when the machine is in its condition awaiting an answer, an error tone is generated for approximately two seconds. This is accomplished by the shorting of the input contact 132 and output contact 130 to ground through the conductive coding bar on the visual strip 62 (see FIG. 3). When the input contact 132 is shorted to ground, the lead 376 to the voltage divider resistors 372 and 374 is grounded, such that a more positive or ground potential is placed on the base of transistor Q15. Since the collector of transistor Q15 is connected through a load resistance 430 to the minus 6 volt supply and the emitter is connected through resistor 432 to ground, the more positive base voltage on transistor Q15 causes it to be cut off. This cut-off condition is employed to trigger a monostable multivibrator 434 consisting of transistors Q18 and Q16, each of the type PNP.

The common emitters of transistors Q16 and Q18 are connected to ground through a resistor 436 and the common emitter resistor 432 of transistor Q15. The collectors of transistors Q16 and Q18 are connected through load resistors 438 and 440, respectively, to the minus 6 volt supply. Cross coupling is provided from transistor Q16 collector through a timing capacitor 442 and resistor 444 to the base of transistor Q18, and cross coupling is provided from the collector of transistor Q18 through resistor 446 to the base of transistor Q16. In this instance, a transient suppressing capacitor 448 is connected between the base of transistor Q16 and ground. In the stable conduction state of mono-stable multivibrator 434, the transistor Q18 is conducting and the transistor Q16 is cut off. A bias resistor 449 maintains the base of transistor Q18 at the proper stability level.

In the event of an incorrect answer, the grounding of input lead 376, the transistor Q15 is cut off and an increased negative voltage is applied through resistor 450 to the base of Q16, thereby setting transistor Q16 into conduction and placing the mono-stable multivibrator 434 in its quasi-stable state of conduction. The multivibrator 434 will remain in its quasi-stable state about two seconds or until capacitor 442 charges sufficiently to allow it to revert to its stable state. During the quasi-stable conduction, the voltage on transistor Q16 collector is dropped to near ground potential and this voltage is coupled via lead 312 back to the transistor stage Q17 in FIG. 8A. This control voltage on line 312, when applied to the base of transistor Q17, allows it to cease conduction during the two second period wherein the mono-stable multivibrator 434 conducts in its quasi-stable state. The audio regenerative feedback through resistor 314 on lead 316 then causes the error tone to be reproduced in the audio stages and the loud speaker 244 (or earphones), as has been previously described.

A further protective measure is included in order to prevent the advance of the visual strip, as by movement of the visual strip drive motor 390, when an incorrect answer indication has been given by the participating student. In this condition, the incorrect answer push button will ground the input on lead 376 so that transistor Q15 is cut off with the consequent triggering of the mono-stable multivibrator 434 to its quasi-stable state (transistor Q16 conducting and transistor Q18 cut off). This condition then causes a high negative voltage at the junction 452 in the collector circuit of transistor Q18.

This negative voltage, during error condition, is conducted first on a lead 454 through a resistor 456 to place an increased negative bias on the transistor Q19. This bias voltage causes transistor Q19 to go into conduction, thus presenting a low impedance across the transistor Q10 and Q14, such that the strip motor 390 is prevented from running. Thus, in the event of an error, the visual information strip 62 (FIG. 2) is not able to be advanced. The error tone will hold multivibrator 320 in its state two condition which will not allow the phonograph to start during the error tone period, even though the correct answer button is pressed. This prevents defeat of the answering function of the machine by pressing all buttons simultaneously or in rapid sequence.

In one embodiment of the invention, Q17 and resistors 314, 310, 304 and 306 are omitted and resistor 453 and capacitor 455 are added. In this embodiment the phonograph is caused to run forward during the two second error period, and no tone is generated. The voltage developed at the junction 452, conducted through resistor 453 and capacitor 455 causes multivibrator 320 to revert to state one when the incorrect answer button is pressed and to be re-set to state two when the mono-stable multivibrator goes to its stable state. This embodiment called "zero-order" branching provides a two second period for additional instructional material, a short aid or prompt, after which the phonograph will again stop and await a student response.

It is also desirable that the strip motor be prohibited from advancing the visual strip 62 when the phonograph motor is in its reverse condition. This is accounted for since when the forward-reverse switch 352 is placed in its reverse position, a reverse control voltage is conducted from junction 358 through a lead 360 and leads 460 and 462 to the input resistance 458 at the base of transistor Q19. This negative control voltage on the base of transistor Q19 also sets it into conduction so that the drive transistors Q10 and Q14 are again prohibited from producing current flow through lead 386 and the visual strip drive motor 390.

Still another branch of the reversing control signal on lead 460 is tapped off at junction 464 through resistance 466 to the base of transistor Q15 so that it will prevent the mono-stable multivibrator 434 from being flipped to its quasi-stable state during the period of reversal of the phonograph motor 350 even if one of the answer buttons is depressed. This then enables the phonograph to be backed up for replay of a desired segment without interference from control tone pickup which would alter the instanteous logic condition.

For synchronization purposes, the forward-reverse switch 352 also may be utilized to advance the phonograph past a control tone without advancing the visual strip 62. With the multivibrator 320 in the state two condition, awaiting a student response, pressing of the forward-reverse switch 352 causes a charge to build up on capacitor 362. When switch 352 is pressed and released in a short period, the charge developed on capacitor 362, through resistor 364 causes the multivibrator 320 to revert to state one and to be held in this state until the charge on capacitor 362 has decayed. The time constant of capacitor 362 and resistor 364 is chosen to hold the multivibrator in state one conduction sufficiently long to allow the phonograph to run through the first control tone immediately after rapidly pressing and releasing the forward-reverse switch 352. This permits re-synchronizing the record and visual strip when the visual strip is ahead for any reason.

*Operation*

The operation of the teaching machine 10 will be described with particular description directed to FIGS. 3, 8A and 8B, other pertinent figures being noted. After the student has selected his material which would be a coordinated set of a visual strip 62 and the proper record 90 including the synchronized, control tones in the audio information. The student then places the record 90 and strip material 62 in the teaching machine as shown in FIG. 3 at their proper starting positions. The tone arm 52 would then be placed on the starting edge of the record and the switch 190 (see FIG. 7) would be closed to enable system operation. It is only necessary then to close the lid 14 of the teaching machine case which opens switch contact 106 (FIG. 4A) to allow grounding of the framing circuit only through the conductive ink bars which are present between the information blocks on the visual strip material 62.

As shown in FIG. 6B, for the case of a three answer choice code plus an entertainment code configuration, the proper conductive ink configuration is present between the information blocks for each frame so that the necessary programming and start-stop control can be exercised throughout the study of the audio-visual material. This makes provision for acceptance by the machine of a correct answer or alternative measures of operation in response to incorrect answer by the student. These will become apparent as the operational description proceeds. A further code conductor may be provided to supply an "entertainment" mode of operation wherein no student response is required.

Assuming then that the operation has begun and the visual information block is within the view of the viewing window 18 as shown in FIG. 3, the phonograph would play the audio portion of the lesson which is coordinated with that visual information present in the block. During this period, (refer to FIG. 8A) the playback reproducer 56 would supply the necessary audio voltage to the transistor amplifiers Q1 and Q11, emitter followers, which would match the input impedance to the voltage amplifier Q2. The amplified audio voltage present on lead 230 would then be applied to the complementary emitter followers, transistors Q3 and Q4, such that they would drive the speaker 244 or other audio reproducer to give an audible output.

Control tones are recorded on the audio record medium and these tones may be in the audible or sub-audible frequency range. Sub-audible control tones are commonly used in many systems to avoid the distraction of desired audible sounds. The machine herein described uses an audible tone, 250 cycles per second, in order to utilize low-cost components. The voice level in the 250 cycle area may be attenuated on the recorded medium to prevent unwanted actuation of the control circuitry.

After the segment of audio information has been completed, a 250 cycle control tone would be produced through the playback cartridge 56. This control tone would also be amplified through the audio system and would be tapped off at junction 240 between the emitters of the complementary emitter followers, transistors Q3 and Q4, whereupon it would be applied to the transistor circuits Q12 and Q13 which serve to discriminate against most audio frequency voltage except the desired control tone. The output of Q13 utilizes a Twin "T" active filter which leads back to the input of the transistor Q12, the initial emitter follower in the circuit. This then allows accentuation and primary amplification of the 250 cycle control tone which is present on lead 284 to the tone amplifier transistor Q5. The transistor stage Q5 then amplifies, rectifies, and integrates the tone signal over a fraction of a second and supplies this control signal on lead 300 to the bi-stable multivibrator 320 of FIG. 8B.

When the phonograph was running, the bi-stable multivibrator 320 was in its first stable state wherein transistor Q7 is conducting and transistor Q6 is cut off. Then with application of the control signal on lead 300 the multivibrator 320 is caused to reverse its conduction to state two whereupon it will cease to drive to the phonograph drive motor 350. After reversal of conduction to its second stable state, transistor Q6 is conducting and transistor Q7 is non-conducting to apply a high negative voltage on the base of a transistor Q8. This base bias causes conduction of transistor Q8 with a more positive voltage being applied to the bases of transistors Q9 and Q21. Since, in normal operation, the forward-reverse switch 352 is in its forward position, the transistor Q9 will be affected by the base voltage from the collector of transistor Q8. Hence, the transistor Q9 will be cut off, ceasing current flow from the minus six volt supply through the transistor Q8 and the phonograph drive motor 350 to ground.

At this point the audio-visual presentation has played through one segment of its program. That is, the phonograph has played through the segment giving the necessary audible information and has ceased operation upon coming to a recorded control tone. During this time a particular and coordinated portion 92 of the visual strip information has been present in the viewing window 18 and the appropriate conductive ink coding configuration (94, 96, 102 etc.), which is matched to the particular information of that segment of the overall message, is in contacting position with the push button switch mechanism 134 for student actuation. The recorded audio message might include a question which the student is to answer by means of the push buttons 24, 26 and 28 or the question may be written in the visual presentation area 93 whereupon the student can then make his push button selection as to the proper answer or alternatives.

In the event of the correct answer by the participating student, input 132 and output 130 will be shorted together (but not grounded) and thus provide a more negative control voltage from the collector of transistor Q7 (cut off in state two) on lead 376 through the input-output connection and then through the resistor 378 on lead 380 to the base of transistor Q10. The base of transistor Q10 is then biased into conduction and this in turn causes Q14 to conduct heavily through the visual strip drive motor 390 to the minus 4.5 voltage supply. Upon the start of drive movement from the visual strip drive motor 390, the framing contact 110 is ungrounded. That is, the framing portion of the conductive ink band (94, 98, 100 etc.) on the code band of visual strip 62 will have been moved out of contact with the ground and framing contacts (136 and 138, FIG. 5) of the strip mechanism 134 and, thus, the framing contact 110 will be ungrounded.

Upon this occurrence, the framing voltage present on lead 394 as tapped from junction 402 of the voltage divider resistors 396 and 398 will provide a first negative biasing voltage via lead 380 to the base of Q10 to maintain it in conduction such that Q14 will remain in heavy conduction through the visual strip drive motor 390. Thus, the strip will continue to move. A second lead 404 from the junction 402 provides the negative potential to the base of transistor Q7 causing it to go into conduction thereby reversing the state of multivibrator 320 to its state one whereby the phonograph drive motor 350 is started.

The phonograph drive motor 350 is then allowed to start and attain speed prior to the stopping of the visual strip as follows: when the visual strip information block 92 once again comes into proper viewing position, (that is, aligned with the viewing window 18), the framing conductive ink strip 94 will again be in contacting relationship to contact fingers 136 and 138 (FIG. 5) to ground the framing contact 110. This grounds the negative bias voltage provided at junction 402. The teaching machine is then at the beginning of a new segment of information whereby the phonograph is running and reproducing the audio message and the visual strip 62 is held in its proper position in the viewing window 18.

An alternate method of affecting a correct answer response would be by means of a voice-operated relay, whose contacts briefly connect input 132 to output 130. Thus, when the machine is awaiting an answer, an oral response will cause the machine to advance. By adding an additional set of two contacts to the contact mechanism 134 it is possible to arrange the conductive coding such that, on a programmed basis, either a voice or a push button response is required to indicate a correct answer.

In the event that the participating student had made an incorrect answer by pushing the wrong one of push buttons 24, 26 and 28 when the phonograph was stopped after the previous segment presentation, the logic system would provided a different operation. With incorrect answer response, the input 132 is shorted to the output 130, however, the connection is also shorted to ground. Thus, a ground potential is apparent through resistor 378 to lead 380 and the base of transistor Q10 such that transistor Q10 is not conducting, and by the same token, the drive transistor Q14 will be maintained in non-conduction so that no visual strip drive is produced in the strip drive motor 390.

Also, in the vent of incorrect answering, the ground potential present on input lead 376 is applied through the resistor 374 to the base of the transistor Q15 (which is normally conducting) and the ground potential base voltage cuts off transistor Q15, thereby causing an increased voltage to be applied to the base of Q16, the non-conducting transistor in the mono-stable multivibrator 434. This base voltage then throws the multivibrator 434 to its quasistable state with transistor Q18 cut off and transistor Q16 conducting for a time as controlled by the charging rate of capacitor 442 and the resistor 444. During this charge time, a more positive voltage is conducted from the collector of transistor Q16 through the lead 312 back to the base circuit of transistor Q17, error tone gate circuit, which is normally in conduction.

The positive going voltage on lead 312 is applied to the base of transistor Q17 and cuts off conduction for about the two-second charge time of capacitor 442 in the mono-stable multivibrator 434. With transistor Q17 cut off, a portion of audio tone signal from junction 282 is conducted through resistor 310 and resistor 314 to the feedback lead 316 which applies regenerative feedback to the base of the audio transistor emitter follower Q1. Thus, the regenerative addition causes amplification of the 250 cycle tone signal through the audio system, whereupon it is amplified and reproduced audibly in speaker 244 as an error tone signal for the student's notice. The regenerative feedback on lead 316 which causes tone oscillation through the audio amplifier would normally be shorted to ground by conduction of the transistor Q17; however, in the error condition when mono-stable multivibrator 434 in its quasi-stable state (for a two second duration) the transistor Q17 is maintained open or non-conducting and a regenerative feedback can take place.

The error indication, the grounding of input lead 376, also causes an additional output from the error multivibrator 434 which prohibits advance of the visual strip 62 by the strip drive motor 390. Thus, the grounded base of transistor Q15 causes conduction in transistor Q16 with consequent non-conduction in transistor Q18 and the high negative collector voltage from transistor Q18 is then conducted on lead 454 through a resistance 456 to control the transistor Q19. This places a higher negative voltage on the transistor Q19 so that it is fired into conduction. The low impedance current path from ground to the base of transistor Q10 prohibits conduction of the strip driving transistors Q14 and thus there is no current flow through the strip drive motor 390.

When the student does not depress the proper push button, designating the correct answer, the visual strip 62 is not advanced and a two second error tone is generated through the audio system to give error notice to the student. Thereafter, the student has another choice to push a proper push button so that correct answer information will be supplied to the logic circuitry. Then the visual strip 62 can advance to the next segment 92 of visual information and, simultaneously therewith, the phonograph is restarted to reproduce the audio portion of the lesson which is coordinated with that particular new segment 92 of visual information.

It is immediately apparent that more than three alternative answers can be provided while using the logic circuits and mechanism described; the number of contacts and switches are limited only by space and may be used, with any combination of correct and incorrect answers, without requiring any change in circuitry.

In certain instances the student can exercise additional control over the teaching machine. The push button 20 is provided whereby the reversing switch 352 is actuated so that the phonograph will back up and repeat a given audio portion. When switch 352 (contact 112 in FIG. 4A) is depressed, a negative control voltage is produced at junction 358 through the lead 360 to the base of transistor Q6 thus reversing the stable state of bistable multivibrator 320 to state two, such that transistor Q6 conducts and transistor Q7 is cut off. The collector of transistor Q7 is then driven to a high negative value and this voltage is applied to the base of transistor Q8 causing conduction therein such that, effectively, ground potential will be present on the base electrodes of drive transistors Q9 and Q21. In this condition, the forward drive transistor Q9 will be cut off and the reverse drive transistor Q21, the type NPN transistor, will be put into heavy conduction to drive the phonograph motor 350 in its reverse direction.

This negative reversing control voltage on lead 360 is also conducted on lead 460 to the junction 464 for the purposes of disabling the error response circuitry and strip advance circuitry. Thus, the negative voltage from junction 464 is applied through the resistance 466 to the base of transistor Q15. In the event that any error tones are encountered during the reversal of the phonograph motor drive, the negative voltage from junction 464 will maintain a high negative base potential such that it cannot drop out of conduction to flip the mono-stable multivibrator 434 and thus initiate the error circuitry. Also, the high negative voltage from junction 464 is applied on lead 462 to the base of transistor Q19, thereby maintaining it in conduction so that the base of transistor Q10 is effectively shorted to ground and the drive transistor Q14 cannot conduct to drive the strip drive motor 390.

The push button 22 is provided to actuate the switch 416 (contact 122 in FIG. 4B) so that strip advance can be effected at any time. This switch 416 can be operated when the phonograph is running and, for some reason, the student may desire to advance the visual strip. With the phonograph running, the bi-stable multivibrator 320 is in its stable state one whereby transistor Q6 is cut off and its high negative collector voltage is conducted on lead 418 through resistance 422 to the junction 420. The closure of switch 416 conducts this high negative voltage through the resistance 378 via lead 380 to the base of transistor Q10 thereby setting it into conduction. The conduction of transistor Q10 then fires transistor Q14 into heavy conduction with current flow through the strip drive motor 390 and return through the minus 4.5 voltage supply.

In order to assure that the strip drive motor 390 is stopped each time with precise and rapid action so that the conductive code strips on the visual strip 62 will be properly aligned, the dynamic breaking circuit is employed. This circuit is comprised of transistors Q22 and Q23 which operate to conduct in the reverse direction through the strip drive motor 390 upon actuation by the grounding or removal of the negative signal normally present at junction 402 during strip movement. When the visual strip 62 has come within the proper viewing relationship with window 18, the framing conductive bar will ground the framing contact 110 to discharge the capacitor 408 so that the transistor Q22 is cut off thereby causing transistor Q23 to conduct heavily in the reverse direction through the strip drive motor 390. This need only be a short burst of conduction as controlled by the charge time of the capacitor 408.

An alternative embodiment

FIG. 9 shows a block diagram of an alternative embodiment of the teaching device. The teaching machine 480 enables somewhat greater information dissemination and student participation by employing a stereo record playback system to provide audio information both in the forward and reverse directions of record rotation. This then would enable the initial lesson to be played for a given segment of information, then an answer time during which the student may select a push button or other verifying means, and in the event of a wrong answer selection, the machine can play corrective or additional information on a reverse phonograph setting. It is contemplated to use film strip (not shown) visual information with this alternative device and the manner of performing film strip viewing would be within normal skill. A method which has worked very well utilizes 16 millimeter film with an enlarging lens being employed for direct viewing. It is apparent that the paper visual strip previously described could also be used. The circuitry shown in block diagram form in FIG. 9 is largely the same as that previously set forth in FIGS. 8A and 8B. The blocks of FIG. 9 which have the transistor designations therein would be the same electrical circuits as are set forth in FIGS. 8A and 8B. The several remaining circuits will be further defined below.

Teaching machine 480 utilizes a suitable stereo tone arm consisting of a needle 482 and the stereo oriented pick-ups 484 and 486. The normal forward record playback would be detected by the pick-up 484 and applied to the emitter follower 488, audio amplifier 490 and the emitter follower output stages 492 for reproduction in the speaker or other sound system 494. This would be the same circuitry and function as set forth in the previous embodiment. Also, the tone discriminator 496 would be selective to a specific frequency tone to control the tone amplifier 498 and a similar tone amplifier 500.

The emitter follower 502 would be identical in circuit connection with the emitter follower 488, however it is connected to the other stereo pick-up 486 and would respond to that audio and tone signal which would be detected during reverse playback of the phonograph. This will be further described below. The tone amplifier 500 is also a circuit which is the same as its counterpart, tone amplifier 498, and it is utilized to control the error circuits through a bi-stable error multivibrator 504 which has a similar function to the mono-stable error multivibrator previously described.

In the normal or forward running phonograph condition, the tone amplifier 498 is conducting and maintains the bi-stable multivibrator 506 in stable state one wherein no conduction is present on lead 508 and a phonograph driver 510 is caused to conduct to drive a phonograph drive motor 512 in its forward direction. This forward phonograph condition will exist until the forward stereo pick-up 484 detects a tone signal. This tone signal is selected in the tone discriminator 496 and applied to cut off conduction in the tone amplifier 498, thus switching the multivibrator 506 to its stable state two or "1–0" output wherein conduction on lead 508 ceases the conduction of phonograph driver 510 to the motor 512. Simultaneously, the output 514 of bi-stable multivibrator 506 is switched to its "1–0" state and this conduction indication is present on lead 516 to the input terminal point 518. During this time the tone amplifier 500, having no input, is conducting on lead 520 to maintain the bi-stable multivibrator 504 in its "1–0" condition. The "1–0" condition maintains lead 520 at a potential whereby the reverse phonograph circuitry of the phonograph driver 510 is also maintained off.

Control leads 508 and 514 from multivibrator 506 also go to the emitter followers Q1 and Q1A. When multivibrator 506 is in its forward state, emitter follower Q1 is biased on and Q1A is biased off. When the multivibrator is in its reverse state, the reverse biasing is, in effect, such that the audio signal passes through Q1 only when the phonograph is running forward and through Q1A only when the phonograph is running in a reverse direction.

A schematic diagram of the phonograph driver 510 is shown in FIG. 10. The transistors Q8, Q9 and Q21 are connected for forward phonograph drive in a manner similar to that of FIG. 8B. Also, the transistors Q8A, Q9A and Q21A are connected in the same configuration for complementary drive action. In the forward running direction, a negative input will be present from the bi-stable multivibrator 506 at the lead 508 to the base of transistor Q8. This negative input causes transistor Q8 to conduct through the load resistor 522 to the minus 6 volt supply to develop a voltage on lead 524 to the bases of transistors Q9 and Q21. The transistors Q9, a PNP type, is cut off by the more positive voltage on its base and the transistor Q21, being of the NPN type, is enabled to conduct by the more positive base voltage. Hence, the conduction can take place from ground through transistor Q21 and then from junction 526 through the phonograph drive motor 512 to a junction 528. The opposite conduction state is enabled in transistors Q8A, 9A and 21A and the conduction path can continue through transistor Q9A to the minus 6 volt supply. This is enabled with a more positive voltage supplied on lead 520 from the bi-stable multivibrator 504 so that the transistor Q8A is cut off and there is essentially a minus 6 volt potential below the load resistor 530 on lead 532 to the bases of transisors Q9A and Q21A. Hence, the opposite conduction state is set up since the PNP transistor Q9A can conduct when the NPN transistor Q21A is cut off. By reversing the voltage inputs on leads 508 and 520, that is by cutting off transistor Q8 and turning on the transistor Q8A, reverse current flow can be effected through the phonograph drive motor 512. This condition places transistor Q9 and transistor Q21A in conduction so that current flow is from ground through transistor Q21A, junction 528, reversed through phonograph motor 512, junction 526, transistor Q9 and finally to the minus 6 volt supply.

Referring again to FIG. 9, after the phonograph has played its allotted message and then has been turned off by a tone signal, the equipment is then ready to accept the participating student's response. This action is essentially the same as the prior described embodiment. Coded conductive media are placed upon the film strip in a manner such that a response by the student can actuate one of a series of different circuit connections. A correct answer response will short the output terminal 534 to the input terminal 518 without grounding the connection simultaneously. This connection then allows the proper potential on leads 536 and 538 to the film strip driver 540 such that film strip motor 542 is energized to advance the film strip to the next lesson segment.

A dynamic brake circuit 544 and bias source 546 are utilized in the same manner as in the previous embodiment. The bias source 546 represents the voltage divider consisting of resistors 396 and 398 in FIG. 8B, and the dynamic brake circuit 544 is the same as in the previous embodiment. When the film strip has run its proper course, the ground contact 548 and framing contact 550 are shorted by a conductive code bar to ground the bias source 546 through the framing lead 552. This also actuates the dynamic brake circuit 544 through grounding of lead 554.

In the event of an incorrect answer by the participating student, a further series of actions is initiated. In this case, the input 518 and output 534 are shorted but they are also grounded and this grounding of lead 516 causes error sensor 556 to produce an output on lead 558 which switches the bi-stable multivibrator 504 to its state two condition. This state causes a more negative voltage level on lead 520 to the phonograph driver 510 such that it enables the phonograph motor 512 to drive in the reverse direction. The same voltage level indication on lead 520 is applied to the error tone gate 560, thereby placing a trigger potential on lead 652 to switch the bi-stable mulitvibrator 506 to its opposite stable state. That is, the state wherein no drive signal is present on lead 508 to the phonograph driver 510. Thus, inputs 508 and 520 are both reversed and the phonograph is driven in reverse.

While the bi-stable multivibrator 504 is conducting in its state two condition, the "1–0" output is conducted on lead 566 to the input of the phonograph reverse gate 568. This gate is similar to that in FIG. 8B showing and, as previously described, places a very low impedance across the film strip driver 540, such that the film strip motor 542 cannot operate to advance the film strip during the time when the phonograph is running in the reverse direction.

Meanwhile, however, the reverse pick-up 486 is reproducing additional audio information through the emitter follower 502, audio amplifier 490, emitter follower stages 492 and the sound output device 494. After a preset period of reversed audio, another control tone will be produced to indicate that the addendum information period should end and that the phonograph should once again go to the forward running condition. When the phonograph is in the reverse running condition, a negative bias voltage is taken off at the motor 512 via a lead 570 and this voltage is applied back to the error sensor 556 for the purpose of maintaining the bi-stable multivibrator 504 in its state one condition. This insures proper output on lead 566 to the phonograph reverse gate 568 such that the film strip will be prevented from advancing.

A diode 572 is provided between the biased source 546 via a lead 574 and a lead 576 to an input of the bi-stable multivibrator 506. This diode is included to prevent both multivibrator 504 and 506 from being in state two simultaneously. The addition of this diode serves to restart the phonograph motor and to enable the answer buttons after a break in power application.

*Operation of FIG. 9 embodiment*

In the teaching machine 480, the participating student would employ a stereo cut record with information content bi-directionally cut in the stereo groove. This information would include a control signal for both the forward phonograph information and the reverse phonograph information. These control tones are placed in the record information in accordance with the program of the audio-information as determined by coordination with whatever the visual component of information. The visual information in this case would be placed on 16 millimeter film with the necessary coding conduction means interposed between the frames and with the particular lesson material placed within each frame or block of the film. The student can then align and start the machine with the audio and visual information in coordinated relationship.

In counting the first lesson segment, the proper visual information would be within the film viewing area and the phonograph would be in the forward running condition to give the audio message. After the information segment is completed, the control tone is detected by the pickup 484, amplified through audio amplifier 490, and further selected in tone discriminator 496 for control purposes. This control tone cuts off the tone amplifier 498 such that it switches the bi-stable multivibrator 506 to its opposite stable state and the phonograph driver 510 ceases conduction to stop the phonograph motor 512.

This then leaves the lesson segment completed with the equipment at a stopped condition awaiting the participating student's answer selection. The correct answer shorts the input 518 and output 534 through the appropriate conductive code indicia on the film. Upon shorting the input 518 to output 534 the film strip driver 540 is made to conduct current through the film strip motor 542, thus advancing the film strip. Upon the initial movement of the film, the framing contact is broken by removal of the appropriate conductive strip upon the film, and the bias source 546 is ungrounded so that the multi-vibrators 504 and 506 are reset to their initial conditions. The film strip motor 542 will then continue to drive until the film block is in its proper viewing position whereupon the framing contact 550 will again be shorted to ground by a conductive code strip number. Also at this point the dynamic brake circuit 544 is energized to more rapidly stop the film strip advance.

In the event that a wrong answer button is pushed the input 518 is shorted to the output 534 and this connection is also grounded. The grounding of input lead 516 cuts off the error sensor 556 such that it flips the bi-stable multivibrator 504 to its state two condition. In this state, phonograph driver 510 (see FIG. 10) receives reversed enabling inputs such that the phonograph motor is driven in the reverse direction. Thereafter, the phonograph pick-up 486 detects the reverse phonograph information and applies it through the audio amplifying system to the sound output 494. This sound output consisting of corrective or additional information as to the particular segment of information continues until a control tone is detected in the tone discriminator 496.

The detected tone from tone discriminator 496 cuts off the tone amplifier 500 and once again flips the bi-stable multivibrator 504 to disable the phonograph driver 510 and stop the phonograph motor 512. This is an instantaneous condition as the phonograph immediately begins to advance forward since the bi-stable multivibrator 506 was not flipped by the last preceding tone signal. This is due to the fact that tone amplifier 500 was cut off by the tone since bi-stable multivibrator 504 was in its receptive condition, however, the tone amplifier 498 was not cut off as the bi-stable multivibrator 506 was in the non-receptive condition. These conditions come about because of the fact that the tone amplifiers 500 and 498 have a common collector load resistance with respective active stages in multivibrators 504 and 506.

Once the phonograph has been re-reversed and the present information segment is being replayed in the forward direction, the lesson proceeds until the tone signal is again detected in the forward audio detection member, the record pick-up 484. Upon receipt of the forward control tone, the bi-stable multivibrator 506 will again be flipped by the tone amplifier 498 such that the phonograph driver 510 will stop the motor 512 and the system is once more in a stopped condition awaiting a student answer. In the event of still another incorrect answer, the reverse phonograph procedure could be run through again and in the event of a correct answer, the film strip driver 540 would energize the film strip motor 542 to advance the film strip. During the advance of the film strip, when the ground contact 548 and framing contacts 550 are broken, the bias source 546 resets the multivibrators 504 and 506 so that the phonograph driver 510 commences to energize the motor 512 in the forward playback direction.

There are many other logic operations which it is contemplated to include in the teaching system. However, these operations as set forth herein are believed to include the major and most useful functions which will enable a student to exercise greater control over his teaching machine.

The foregoing invention enables a light-weight, compact teaching machine which consumes very low power and is characterized by long and reliable service life. It should be understood that it is contemplated to use the logic and control circuitry with various combinations of audio information source and visual strip information. The complexity and sophistication of the information sources would be dictated by the exigencies of each particular situation, the important point being, that the logic and control to enable active student participation will be properly integrated.

Changes may be made in the combination and arrangement of elements as heretofore set forth in this specification and shown in the drawings; it being understood, that changes may be made in the embodiments disclosed without departing from the spirit and scope of the invention as defined in the following claims.

What is claimed is:

1. An apparatus for audio-visual presentation with student participation, comprising:
   strip means carrying a series of visual and conductive control indications thereon;
   record means bearing a series of audio and control tone indications;
   means for reproducing said record means to provide an audible presentation;
   means for driving said strip means to present each of the series of visual indications;
   means energized by said control tone indications to stop said means for reproducing;
   first means to be enabled to start said means for driving said strip means;
   second means energized by said conductive control indications to stop said means for driving said strip means after a preset amount of strip advance; and
   means including said conductive control indications providing multiple selection by the participating student for enabling said first means in response to a correct selection and disabling said first means in response to any incorrect selections.

2. An apparatus for audio-visual presentation, comprising:
   record means carrying the audio information and carrying sub-audible control tones;
   strip means carrying a series of visual information frames and a coded conductive area associated with each frame;
   means for reproducing said audio information and control tones;
   drive means for presenting the successive frames of visual information;
   means responsive to said control tone for stopping said means for reproducing; and
   selector means including said coded conductive area which is actuated to energize said drive means to advance said strip means to the next successive information frame.

3. An apparatus for audio-visual presentation, comprising:
   record means carrying the audio information and carrying sub-audible control tones;
   strip means carrying a series of visual information frames and a coded conductive area associated with each frame;
   playback means for reproducing said record means;
   drive means for driving the strip means and presenting the successive frames of visual information;
   means responsive to said control tones for stopping said playback means;
   selector means including said coded conductive area which is actuated to energize said drive means in response to a correct selection only;
   means energized by said selector means for producing an error tone and for preventing energization of said drive means in response to an incorrect selection; and
   means including said coded conductive area for stopping said drive means after an advance of one information frame.

4. An apparatus for audio-visual presentation, comprising:
   record means carrying audio information and carrying sub-audible or audible control tones;
   strip means carrying a series of visual information frames and a coded conductive area associated with each frame;
   playback means for reproducing said record means;
   drive means controlling said strip means for presenting the successive frames of visual information;
   bi-stable conduction means for energizing said playback means when in state one;
   means responsive to said control tone for switching said bi-stable means to state two thereby stopping the playback means;
   selector means including said coded conductive areas;
   means controlled by said selector means to energize said drive means and to switch said bi-stable means to state one in response to a correct selection;
   means including said coded conductive areas for stopping said drive means after the advance of one frame of visual information; and
   means controlled by said selector means to produce an error tone and prevent playback in response to an incorrect selection.

5. Apparatus for audio-visual presentation wherein a record of audio information containing sub-audible or audible control tones is employed to coordinate the presentation of successive frames of visual strip material, comprising:
   playback means for reproducing said audio and control tones;
   drive means for advancing said frames of visual strip material;
   a coded conductive area on the strip material associated with each frame of said visual strip material;
   switching means responsive to a control tone for de-energizing said playback means;
   first selector means enabled by said switching means to be actauted by selected ones of said coded conductive areas to energize said drive means and then said playback means;
   second selector means enabled by said switching means to be actuated by selected ones of said coded conductive areas to prevent operation of said drive and playback means;
   means energized by said second selector means for producing an audible error tone;
   drive control means actuated by selected ones of said conductive areas for stopping said drive means; and
   means responsive to said first selector means for disabling said drive control means until actuated by the next successive conductive area.

6. Apparatus as set forth in claim 5 wherein said switching means comprises:
   a bi-stable multivibrator which is conductive in a first state to energize said playback means, and conductive in a second state to prevent operation of said drive and playback means and to enable said selector means.

7. An apparatus for audio-visual presentation, comprising:
   a record carrying audio information and sub-audible or audible control tones;
   a strip carrying frames of visual information and having a series of coded conductive areas situated between each frame;
record playback means;
strip drive means;
a bi-stable multivibrator conducting in state one to energize the playback and enable the strip drive means and in state two to de-energize said playback means and disable said strip drive means;
plural, push-button selector means including said coded conductive areas which provide selective inputs whereby,
  a first ungrounded input will actuate the bi-stable multivibrator to conduct in state one, and additional grounded inputs will actuate the bi-stable multivibrator to conduct in state two;
a mono-stable multivibrator which conducts in the quasi-stable state in response to said additional grounded inputs;
oscillator means providing an audible error tone when triggered by said quasi-stable output;
means responsive to said first ungrounded input to energize said strip drive means; and
means responsive to said quasi-stable output to prevent energization of said strip drive means.

8. An apparatus as set forth in claim 7 wherein said plural selector means comprise:
a plurality of push-button actuators;
a plurality of switches to be respectively actuated and one contact of each being connected by a wiper contact to one of said coded conductive areas; and
means for grounding said coded conductive areas so that only one push-button actuated switch will not find a grounded connection and it will thereby actuate a correct response to cause the bi-stable multivibrator to conduct in state one.

9. An apparatus as set forth in claim 7 wherein said record playback means comprises:
first transistor means cut off by state one conduction of bi-stable multivibrator;
second transistor means conducting in response to said first transistor cut-off to energize said drive motor in the forward direction;
switch means for reversing the polarity of applied voltage to said drive motor;
third transistor means energized by state two conduction of said bi-stable multivibrator means and the consequent conduction of said first transistor means to energize said drive motor in the reverse direction; and
means connecting a reversing control voltage from said switch means to an input to said bi-stable multivibrator to switch it to said state two conduction.

10. An apparatus as set forth in claim 7 wherein said strip drive means comprises:
a strip drive motor;
a transistor energized by said means responsive to said first ungrounded input to conduct current through said strip drive motor; and
means for initiating a burst of reversed current through the strip drive motor to effect dynamic braking when a new frame is aligned to cut-off said transistor by grounding the bias through the respective coded conductive area.

11. An apparatus for audio-visual presentation comprising:
a stereo record carrying forward and reverse audio information in the separate stereo tracks and each track including sub-audible or audible control tones;
a strip carrying frames of visual information and having a series of coded conductive areas situated between each frame;
bi-directional stereo record playback means;
strip drive means;
control means for stopping the playback means forward play upon actuation by a control tone;
plural push-button selector means one of which enables a correct response to advance said strip drive means and start the forward play of the playback means; and
means responsive to the remainder of the incorrect push-button responses to start reverse play of the playback and to inhibit advance by the strip drive means.

12. An apparatus for audio-visual presentation comprising:
a stereo record carrying forward and reverse audio information in the separate stereo tracks and each track including sub-audible or audible control tones;
a strip carrying frames of visual information and having a series of coded conductive areas associated with each frame;
bi-directional stereo record playback means;
strip drive means;
tone discriminator means for producing a selected output in response to a playback of a recorded control tone;
a control multivibrator which is conductive in state one in response to no input of said selected output and which is conductive in state two in response to said selected output;
playback driver means which is enabled in response to said control multivibrator state one conduction to energize said record playback means in the forward direction and energized in response to state two conduction to enable said record playback means in the reverse direction;
strip control means which is enabled by said control multivibrator state two conduction;
a plurality of selector switches one of which provides an ungrounded input and the remaining ones are grounded through contact with said coded conductive area, whereby
  said one ungrounded input designates a correct response and energizes said enabled strip control means and strip drive means to advance the visual information strip, and
  said remaining grounded inputs designate an incorrect response and inhibit said enabled strip control means and then actuate said control multivibrator to state two conduction to drive said playback means in the reverse direction;
means for generating an error indication; and
error multivibrator means energized by said grounded inputs to initiate generation of an error indication and to further enable said playback driver means for reverse operation.

13. An apparatus for audio-visual presentation comprising:
a record carrying audio information and coordinatively spaced, sub-audible or audible control tones;
a strip carrying visual information which is coordinated with coded conductive areas associated with each frame;
record drive means;
strip drive means;
audio playback and amplifying means for producing audible presentation from said record;
means for producing a selected output in response to control tone playback;
a plurality of participation selector switches each in contact with one of said coded conductive areas;
a control multivibrator which is conductive in state one when said selected output is not applied to its control input and conductive in state two when said selected output is applied;
driver means for energizing the record drive means in response to the control multivibrator state one conduction;
strip driver means enabled by said control multivibrator state two conduction for controlling said strip drive means energization;

error multivibrator means;

input means connected to each of said selector switches and the coded conductive areas to provide an ungrounded control voltage in response to correct selector switch actuation to energize said strip drive means, and providing a grounded condition in response to the remaining incorrect switch selections;

frame switch means including said coded conductive areas for ungrounding after short advance of the film strip to thereby drive said control multivibrator to state one conduction whereby the record drive means is energized;

means controlled by grounding of said input means for energizing said error multivibrator to a quasi-conductive state whereby an output is applied to disable said strip driver means;

error oscillator means also controlled by said error multivibrator output to produce an audible error tone through said audio playback means; and means for inhibiting said drive means to maintain the record drive means de-energized until a correct selection has been made.

14. Apparatus as set forth in claim 13 which is further characterized to include:

switch means for setting the control multivibrator in conduction state two and reversing the power through the record drive means; and second driver means for operating the record drive in reverse in response to said state two conduction.

15. Apparatus as set forth in claim 13 which is further characterized to include:

means for reversing current flow through the strip drive means for a short duration to effect dynamic braking of strip movement.

References Cited

UNITED STATES PATENTS

| | | | |
|---|---|---|---|
| 2,279,119 | 4/1942 | Freimann | 88—28 |
| 2,787,669 | 4/1957 | Flan et al. | 179—100.1 |
| 2,985,069 | 5/1961 | Sampson | 88—28 |
| 3,141,244 | 7/1964 | Smith | 35—9 |
| 3,191,315 | 6/1965 | Hannah | 35—9 |
| 3,266,172 | 8/1966 | Heinberg | 35—8 |
| 2,526,516 | 10/1950 | Supitilov | 352—15 |
| 2,843,012 | 7/1958 | Butterworth et al. | 352—15 |
| 3,181,421 | 5/1965 | Nimke et al. | 352—17 X |

EUGENE R. CAPOZIO, *Primary Examiner.*

R. W. WEIG, *Assistant Examiner.*